United States Patent [19]
Inada et al.

[11] Patent Number: 4,982,229
[45] Date of Patent: Jan. 1, 1991

[54] VACUUM CONTACT PRINTING METHOD AND APPARATUS HAVING A FRICTION-REDUCING SHEET

[75] Inventors: Tatsuihiko Inada; Takashi Ohno, both of Shiga, Japan

[73] Assignee: Dainippon Screen Mfg. Co., Ltd., Kyoto, Japan

[21] Appl. No.: 403,977

[22] Filed: Sep. 7, 1989

[30] Foreign Application Priority Data

Sep. 13, 1988 [JP] Japan ............................ 63-120533[U]

[51] Int. Cl.⁵ ............................................. G03B 27/20
[52] U.S. Cl. ...................................................... 355/91
[58] Field of Search ...................... 355/75, 76, 91, 111

[56] References Cited
U.S. PATENT DOCUMENTS 3,658,014  4/1972  Kranz et al. ............................ 355/91
4,580,893  4/1986  Giachetti ........................... 355/91 X Primary Examiner—L. T. Hix
Assistant Examiner—D. Rutledge
Attorney, Agent, or Firm—Lowe, Price, LeBlanc, Becker & Shur

[57] ABSTRACT

A vacuum contact printing apparatus includes: a transparent plate on which an original film and a photosensitive material are placed, an overlay sheet which covers the transparent plate, a friction reducing sheet provided between the transparent plate and the overlay sheet, and an evacuating device for removing air from between the overlay sheet and the transparent plate. The transparent plate is covered with the friction reducing sheet prior to or simultaneously with the covering of the original film and photosensitive material placed on the transparent plate wiht the overlay sheet. Frictional force caused by the change of the form of the overlay sheet can be prevented from being applied to the photosensitive material because the overlay sheet smoothly slides on the friction reducing sheet.

17 Claims, 6 Drawing Sheets

VACUUM CONTACT PRINTING METHOD AND APPARATUS HAVING A FRICTION-REDUCING SHEET

BACKGROUND OF THE INVENTION

1. Field of the Invention

The present invention relates to an apparatus for exposing an image of an original film on a photosensitive material in a pre-press process of a photomechanical printing process, and particularly relates to a vacuum contact printing apparatus for subjecting a photosensitive material such as a photosensitive film or a PS (presensitized) plate to exposure while a flexible overlay sheet absorbed under vacuum on a table where the photosensitive material is placed holds the photosensitive material and an original film placed under the sheet in intimate contact. The present invention further relates to a method for exposure by holding an original and a photosensitive material in intimate contact utilizing vacuum.

2. Description of the Background Art

FIG. 1 is a plan view of a conventional apparatus. The conventional apparatus comprises: a base frame 12 having a transparent plate 10 such as a glass plate on its upper surface; a pin bar 20 provided with two register pins 18 for defining a reference position for registration between an original film 14 and a photosensitive material 16; a sheet roller 22 for winding or spreading an overlay sheet 24 from its free end, the opposite end of the overlay sheet 24 being fixed to one side of the upper surface of the base frame 12 by means of a fixing member 23; evacuating means 28 for removing air from between the transparent plate 10 and the overlay sheet 24 when the overlay sheet 24 is spread over the transparent plate 10; and a light source (not shown) for exposure, provided under the transparent plate 10. An evacuating groove 26 communicating with the evacuating means 28 is formed around the transparent plate 10. The overlay sheet 24 has sufficient width and length to entirely cover the evacuating groove 26 when it is spread over the base frame 12. The overlay sheet 24 is a rubber sheet which flexibly changes its form in vacuum contact with the base frame, making it possible to tightly hold the original film 14 and the photosensitive material 16. Further, the rubber overlay sheet 24 has sufficient durability.

Referring to FIGS. 1 and 2, the operation of the conventional apparatus will now be described. The overlay sheet 24 is wound on the sheet roller 22 beforehand. The evacuating means 28 is not in operation. The operator places and registers the original film 14 and the photosensitive material 16 on the transparent plate 10 by using the register pins 18 provided on the pin bar 20. The registration is carried out by inserting the register pins 18 into register holes formed in the original film 14 and the photosensitive material 16.

When the sheet roller 22 rotates and moves toward the direction of the arrow B, the overlay sheet 24 spreads over the original film 14 and the photosensitive material 16. After the overlay sheet 24 is sufficiently spread, the evacuating means 28 operates and discharges the air through the evacuating groove 26. As a result, the overlay sheet 24 is absorbed on the transparent plate 10, whereby the original film 14 and the photosensitive material 16 placed thereunder are held in close contact.

Light L for exposure is applied from below. As a result, a latent image corresponding to an image on the original film 14 is formed on the photosensitive material 16. Subsequently, the evacuating means 28 stops and the overlay sheet 24 is released from the vacuum. After the sheet roller 22 winds up the overlay sheet 24, the original film 14 and the photosensitive material 16 are taken out from the transparent plate 10.

As described above, the overlay sheet 24 is made of rubber. When absorbed on the transparent plate 10 under vacuum, the overlay sheet 24 stretches suitably, thereby making the intimate contact between the original film 14 and the photosensitive material 16 more reliable.

The apparatus for spreading the overlay sheet 24 by using the sheet roller 22 has various advantages as described below. One of the advantages is that it is easy to automatically carry out the operation of spreading the overlay sheet 24. Another advantage is that the air between the overlay sheet 24 and the transparent plate 10 is removed smoothly by means of a pressing roller which is provided behind the sheet roller 22 (in the direction of the fixing member 23), though not shown in FIGS. 1 and 2, and presses the overlay sheet 24 while moving together with the sheet roller 22. A further advantage is that the original film 14 and the photosensitive material 16 are hardly misaligned due to air current because there is not large movement of air in spreading the overlay sheet.

Normally, in color printing, four printing processes using cyan, magenta, yellow and black inks are carried out. For the printing by using the inks of those colors, it is necessary to prepare color separation films corresponding to those colors and to print images of those color separation films onto PS plates and so on. Those images are formed by fine dots for convenience of printing. Accordingly, in order to print the images on other photosensitive material, it is necessary to prevent disagreement of the images and error in size as far as possible. Therefore, for the above described reasons, the original film and the photosensitive material registered by the register pins are maintained in intimate contact under vacuum.

However, the conventional apparatus has disadvantages as described below. Prior to the printing of the images, the overlay sheet 24 is spread over the photosensitive material 16. Since the overlay sheet 24 is a relatively thick rubber sheet, force F pushing back the photosensitive material 16 toward the direction of the arrows b is applied to the contact face 24a between the overlay sheet 24 and the photosensitive material 16. The causes for this phenomenon are considered to be as follows.

When the overlay sheet 24 is wound around the sheet roller 22, stress due to tension occurs in the outer circumferential portions of the overlay sheet 24. Stress due to contraction occurs in the inner circumferential portions of the overlay sheet 24. When the overlay sheet 24 spreads from the sheet roller 22, the outer circumferential portion of the overlay sheet 24 contracts and returns from the state subjected to the tension stress to the normal state. This change occurs in the portion of the overlay sheet 24 contacting the photosensitive material 16. Consequently, frictional force F of the overlay sheet 24 is applied to the upper surface of the photosensitive material 16 in the direction of the arrows b.

This force F sometimes causes the photosensitive material 16 to move in the direction of the arrows b with respect to the original film 14. As a result, registration is incorrect. Accordingly, the quality of the final color printing is lowered.

SUMMARY OF THE INVENTION

An object of the present invention is to provide a vacuum contact printing apparatus for exposing an original image on a photosensitive material in intimate contact with an original film, and a method therefor, by which the above described disadvantages can be avoided.

A vacuum contact printing apparatus according to the present invention is an apparatus for optically printing an image of an original film on a photosensitive material in intimate contact with an original film, including: a transparent original supporting plate having a first surface; a flexible original holding sheet, i.e., an overlay sheet, for covering the first surface; a first winding device; a friction reducing device; a light source; and an evacuating device.

The original film and the photosensitive material in intimate contact are placed on the first surface. The overlay sheet covers the first surface and holds the original film and the photosensitive material placed on the first surface, under the sheet. The overlay sheet is normally wound on the first winding device in a manner including distortion. The overlay sheet is unwound from the first winding device when it holds the original film an the photosensitive material. The friction reducing device is provided between the first surface and the overlay sheet covering the surface and it reduces friction between the overlay sheet and the intimately contacted original film and photosensitive material. The evacuating device removes the air between the overlay sheet and the first surface. The light source supplies light for exposure to the original film from the side opposite to the photosensitive material.

In the vacuum contact printing apparatus thus constructed, the frictional force of the intimately contacted original film and photosensitive material with the original holding sheet is reduced. Accordingly, even when the distortion of the original holding sheet is eliminated by the unwinding thereof, no deviation occurs in the contact between the original film and the photosensitive material due to the frictional force caused in connection with the elimination of the distortion. Thus, a vacuum contact printing apparatus is provided that able to solve the problems encountered in the conventional apparatus.

According to another aspect of the invention, a vacuum contact printing method uses an apparatus including: a transparent plate having a first surface; an overlay sheet for covering the first surface; a sheet roller for winding the overlay sheet; a friction reducing sheet; a light source; and an evacuating device for removing the air between the overlay sheet and the. This method includes the steps of: placing an original film on the first surface; placing a photosensitive material on the original film; covering the placed original film and photosensitive material with the friction reducing sheet; spreading the overlay sheet while rotating the sheet roller on the friction reducing sheet, causing the overlay sheet to cover the first surface of the transparent plate; removing the air from between the transparent plate and the overlay sheet; and supplying light from the light source, thereby optically printing an image of the original film on the photosensitive material.

According to the above described method, simultaneously with or prior to the spreading of the overlay sheet, the friction reducing sheet is spread and interposed between the overlay sheet and the photosensitive material on the transparent plate. Accordingly, even if the stress applied to the overlay sheet changes at the time of the spreading, the photosensitive material does not move due to frictional force caused by the change. This is because the force caused by the change in the stress applied to the overlay sheet is absorbed by the friction reducing, sheet. Consequently, it is possible to provide a vacuum contact printing method for exposing the original image on the photosensitive material in vacuum contact with the original film, and which can overcome the disadvantages in the prior art.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
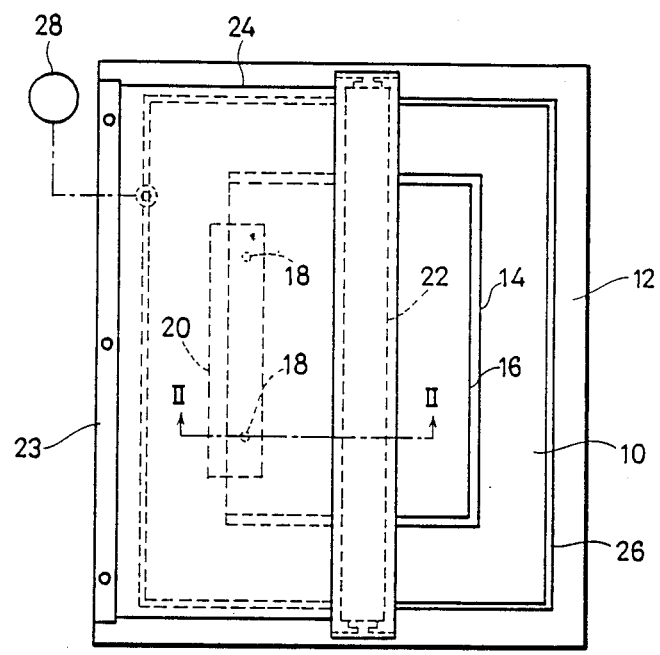
FIG. 1 is a plan view of a conventional apparatus.
Figure 2:
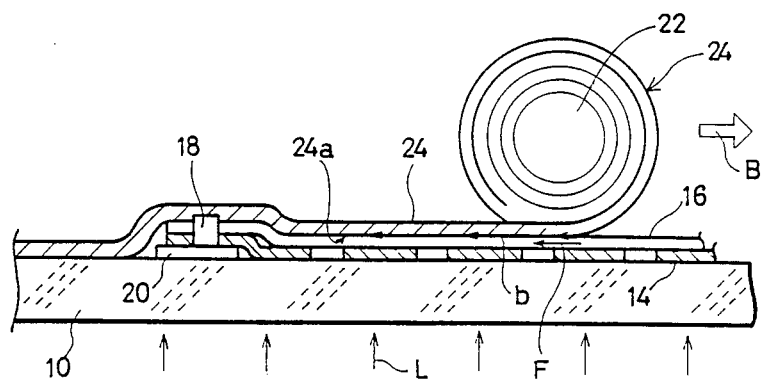
FIG. 2 is a sectional view taken along the direction II—II in FIG. 1.
Figure 3:
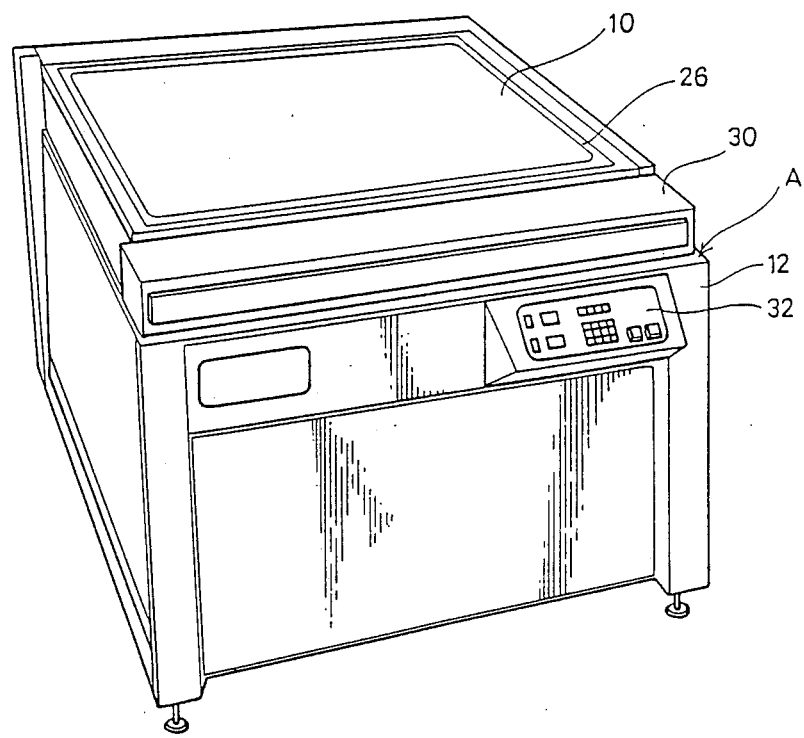
FIG. 3 is a perspective view of a vacuum contact printing apparatus.
Figure 4:
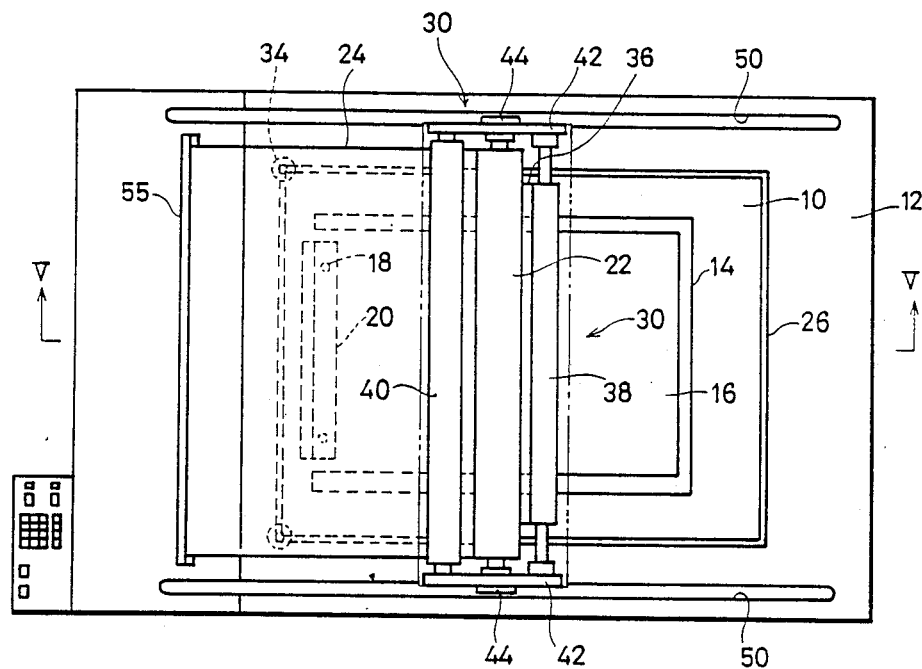
FIG. 4 is a plan view of a vacuum contact printing apparatus according to the present invention.
Figure 5:
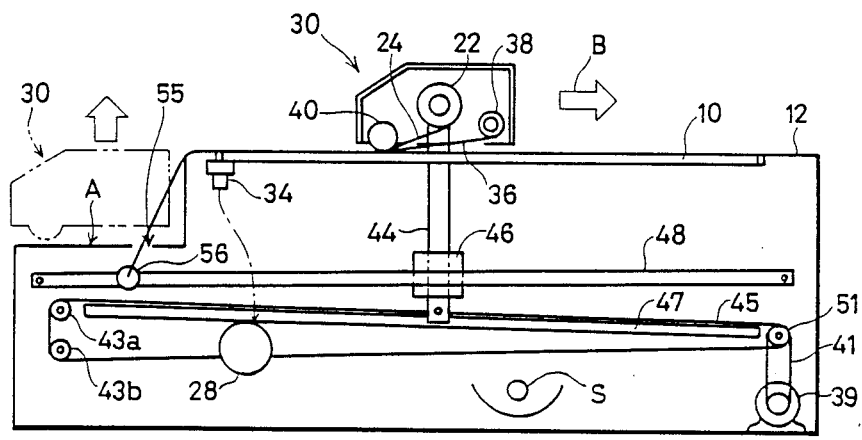
FIG. 5 is a sectional view taken along the direction V—V in FIG. 4.

Referring to FIGS. 3 to 6a, a vacuum contact printing apparatus according to an embodiment of the present invention comprises: a base frame 12 having a transparent plate 10 on its upper surface; a sheet roller unit 30 which runs on the base frame 12, to spread an overlay sheet 24 and a friction reducing sheet 36 over the transparent plate 10; evacuating means 28 such as a vacuum pump for removing the air between the transparent plate 10 and the overlay sheet 24; and a light source S provided under the base frame 12, for supplying light for exposure from below the transparent plate 10. An operation panel 32 is provided on the front surface of the base frame 12. An evacuating groove 26 is formed in peripheral portions of the transparent plate 10 on the upper surface of the base frame 12 and it communicates with the evacuating means 28 through evacuating openings 34.

The sheet roller unit 30 comprises a sheet roller 22 for winding the overlay sheet 24, a friction reducing sheet roller 38 for winding the friction reducing sheet 36, and a pressing roller 40 which moves on the overlay sheet 24 while pressing the sheet 24. The sheet roller unit 30 further includes a pair of side plates 42 for supporting each of the rollers 22, 38, 40 at both ends thereof rotatably around its axis, supports 44 for supporting the corresponding side plates 42, and running frames 46 for supporting the supports 44 in a vertically movable manner.

Guide rails 48 are provided in inner lower portions of the base frame 12. Both ends of each guide rail 48 are fixed to the base frame 12. The guide rails 48 are parallel to the transparent plate 10. Components as mentioned below are further provided under each of the guide rails 48 in the base frame 12. Sprockets 43a, 43b are provided rotatably and arranged vertically near an end of a standby table A; a sprocket 51 is provided in an end opposite to the standby table A; and a motor 39 has its rotation axis coupled to the sprocket 51 by means of a belt or chain 41. An endless chain 45 is put on the sprockets 43a, 43b, 51 and it is supported by a chain support bar 47 provided thereunder. A bottom end of each support 44 is coupled to the corresponding endless chain 45. Accordingly, the supports 44 move rightward and leftward according to the rotation of the endless chains 45.

Each of the running frames 46 has two pairs of rollers 49 between which the respective guide rail 48 are held. As a result, the running frames 46 are able to run along the guide rails 48. A pair of elongate holes 50 are formed in the upper surface of the base frame 12 and the pair of supports 44 pass therethrough. Consequently, the respective rollers 40, 22, 38 can move on the transparent plate 10 according to the running of the running frames 46.

The sheet roller unit 30 is driven by the motor 39 and the endless chain 45, and it moves on the transparent plate 10. The portion on the side of the operation panel 32 of the base frame 12 has a stage which forms the sheet roller unit standby table A. The sheet roller 30 waits on the standby table A during preparation for printing.

A slit 55 for fixing the sheets is formed in the standby table A. The slit 55 extends in a direction perpendicular to the running direction of the sheet roller unit 30, and an end of the overlay sheet 24 and an end of the friction reducing sheet 36 are inserted in it. A fixing member 56 for fixing the sheets is provided under the standby table A. The fixing member 56 is parallel to the slit 55 with both its ends fixed to the base frame 12, the end of the overlay sheet 24 and the end of the friction reducing sheet 36 being fixed thereto.

A pin bar 20 having register pins 18 similar to those in the prior art is provided on the upper surface of the transparent plate 10. An eraser brush 52 is provided in a lower top end of the sheet roller 30 on the side opposite to the standby table A.

Figure 6:
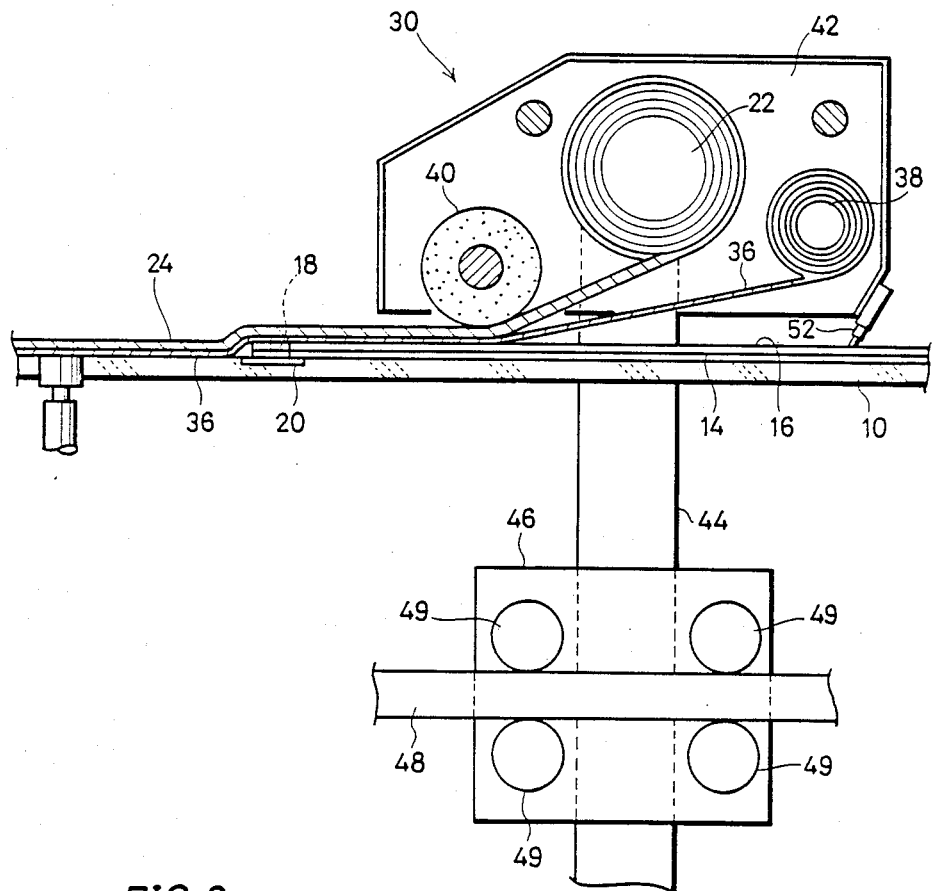
FIG. 6 is a partial enlarged sectional view of FIG. 5.
Figure 6A:
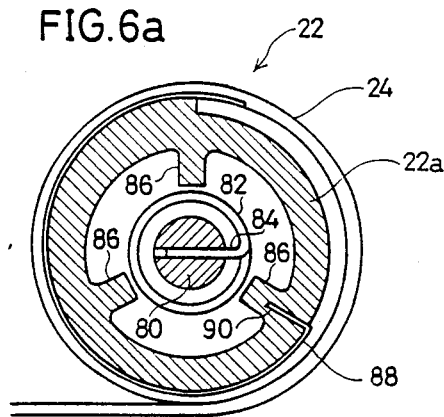
FIG. 6a is a sectional view of a sheet roller 22.

With particular reference to FIG. 6a, the sheet roller 22 includes a hollow roller body 22a provided rotatably with respect to a core shaft 80, and a coil spring 82 provided in the hollow portion of the roller body 22a. An end 84 of the coil spring 82 is stopped by the core shaft 80 and the other end thereof is fixed to a portion (not shown) of the roller body 22a. Since the core shaft 80 is fixed, the roller body 22a is energized to rotate in the direction of winding of the overlay sheet 24.

A thin stop sheet 88 is fixed to the top end of the overlay sheet 24 and the top end of the sheet 88 is inserted in and fixed to a slit 90 formed in the longitudinal direction of the surface of the roller body 22a. Three elongate projecting members 86 are provided in the hollow portion of the roller body 22a. The projecting members 86 support the coil spring 82 stably and contribute to increase of the strength of the roller body 22a.

The overlay sheet 24 is made of an elastic material such as rubber. The friction reducing sheet 36 is a thin sheet made of a material having a small friction coefficient on both surfaces. The friction reducing sheet 36 is for example a sheet of polyester or nylon, or a thin sheet coated with fluororesin (e.g., polytetrafluoroethylene).

Referring to FIGS. 3 to 6a, the operation of the vacuum contact printing apparatus will be described. The sheet roller unit 30 is positioned on the standby table A and the whole surface of the transparent plate 10 is exposed. The operator places the original film 14 and the photosensitive material 16 one upon the other on the transparent plate 10. Holes for registration are formed in advance in the original film 14 and the photosensitive material 16 (though not shown). The register pins 18 are inserted into the holes for registration, whereby the original film 14 and the photosensitive material 16 are registered.

When the operator presses a start button (not shown) on the operation panel 32, the motor 39 operates and at the same time the endless chains 45 are driven, so that the sheet roller unit 30 starts to move. The unit 30 is first elevated from the standby table A to the upper surface of the base frame 12. Subsequently, the unit 30 moves on the transparent plate toward the direction shown by the arrow B along the lengths of the elongate holes 50.

According to the movement of the unit 30, the sheet roller 22 and the friction reducing sheet roller 38 also move. Since the respective ends of the overlay sheet 24 and the friction reducing sheet 36 are fixed by the fixing member 56, the overlay sheet 24 and the friction reducing sheet 36 are unwound from the sheet roller 22 and the roller 38, respectively. The pressing roller 40 moves in the direction of the arrow B while pressing the overlay sheet 24. The air from between the overlay sheet 24 and the transparent plate 10 is removed mainly in the direction of the arrow B by the operation of the pressing roller 40.

The friction reducing sheet 36 is interposed between the overlay sheet 24 and the photosensitive material 16. If a change occurs in the stress applied to the overlay sheet 24 due to the unwinding thereof, which was a problem in the prior art, the overlay sheet 24 smoothly slides on the upper surface of the friction reducing sheet 36. Even if the friction reducing sheet 36 slightly moves due to the friction with the overlay sheet 24, the photosensitive material 16 is maintained in the correct position because the friction between the sheet 36 and the photosensitive material 16 is small.

After the overlay sheet 24 is sufficiently spread to cover all the evacuating groove 26, the evacuating means 28 starts to operate. The evacuating means 28 discharges the air between the overlay sheet 24 and the transparent plate 10 through the evacuating groove 26. The overlay sheet 24 is absorbed on the transparent plate 10 and flexibly changes its shape to tightly hold the original film 14 and the photosensitive material 16 on the transparent plate 10. Although this evacuation takes a predetermined time, the time can be reduced by the operation of the pressing roller 40 as compared with an operation not utilizing the operation of the pressing roller 40.

When the original film 14 and the photosensitive material 16 are held in contact, the light source S emits light to print an image of the original film 14 onto the photosensitive material 16. Since the relative position of the photosensitive material 16 and the original film 14 is correctly maintained as described above, the formed image is an accurate reproduction of the original image on the film 14.

After the exposure, the vacuum state set by the evacuating means 28 is cancelled. The motor 39 operates to rotate the endless chains 45 in the reverse direction, and the unit 30 moves in the direction of the standby table A. Since the rollers 22 and 38 are activated toward the direction of winding of the sheets 24 and 36, respectively, the overlay sheet 22 is wound on the sheet roller 22 and the friction reducing sheet 36 is wound on the roller 38.

If the friction reducing sheet 36 is made of nylon or polyester, the photosensitive material 16 and the sheet 36 are apt become to stuck together due to static electricity. The eraser brush 52 removes the static electricity and prevents the photosensitive material 16 from being wound on the roller 38 together with the friction reducing sheet 36.

Figure 7:
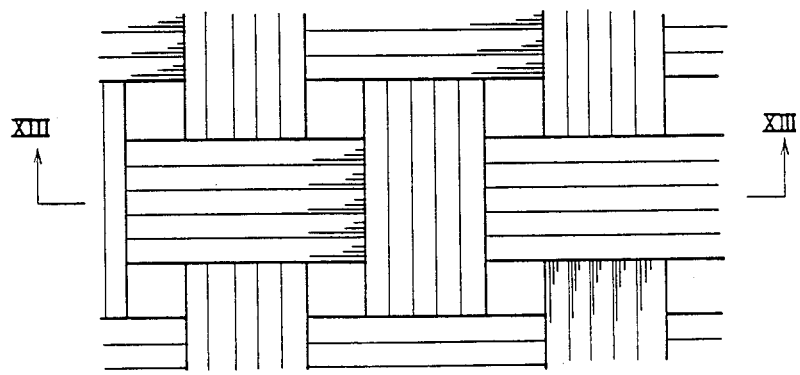
FIG. 7 is a plan view of a surface of a friction reducing sheet.
Figure 8:
FIG. 8 is a sectional view taken along the direction VIII—VIII in FIG. 7.

The friction reducing sheet 36 may have any surface, so long as it has a low friction coefficient and stably holds the photosensitive material 16. However, the lower surface of the sheet 36 preferably has a form which makes it possible to discharge the air rapidly. FIG. 7 is a plan view of an example of the lower surface of the sheet 36. FIG. 8 is a sectional view taken along the direction VIII—VIII in FIG. 7. If the sheet 36 has the form as shown in FIGS. 7 and 8, the air between the sheet 36 and the transparent plate 10 rapidly escapes to outside through the recessed portions on the surface of the sheet 36. Thus, the evacuation by the evacuating means 28 as well as the evacuation by the pressing roller 40 is carried out rapidly.

Figure 9:
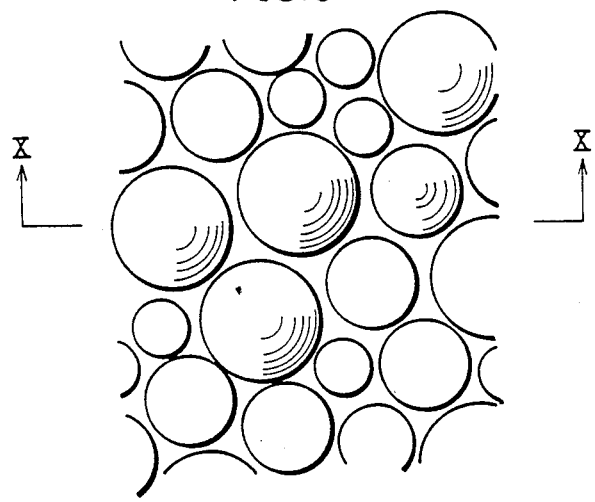
FIG. 9 is a plan view of a surface of another embodiment of a friction reducing sheet.
Figure 10:
FIG. 10 is a sectional view taken along the direction X—X in FIG. 9.

FIG. 9 is a plan view showing another example of the lower surface of the friction reducing sheet 36. FIG. 10 is a sectional view taken along the direction X—X in FIG. 9 The form shown in those figures is preferable because it serves to rapidly discharge the air.

Figure 11:
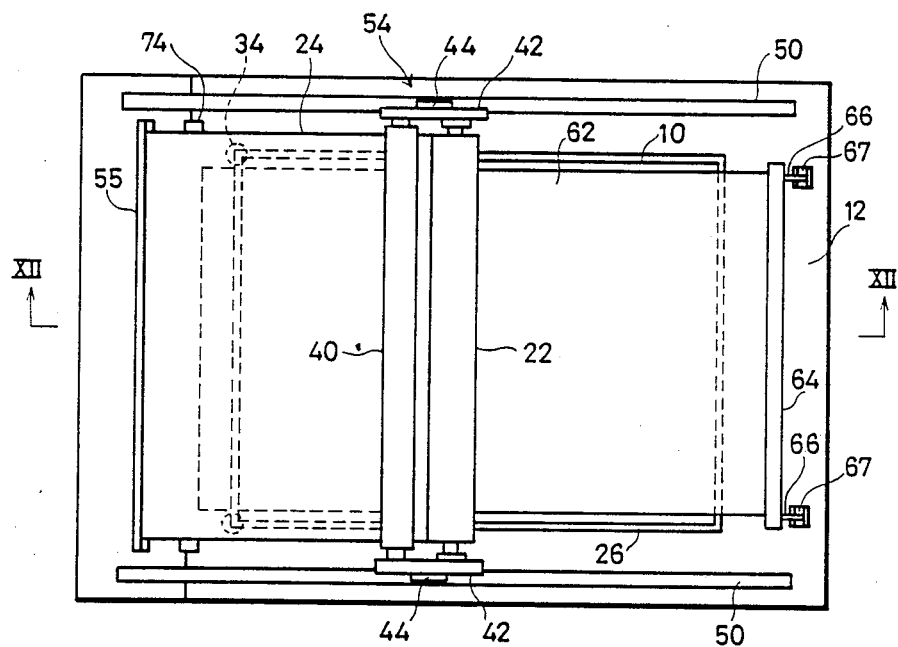
FIG. 11 is a plan view of a vacuum contact printing apparatus according to another embodiment of the present invention.
Figure 12:
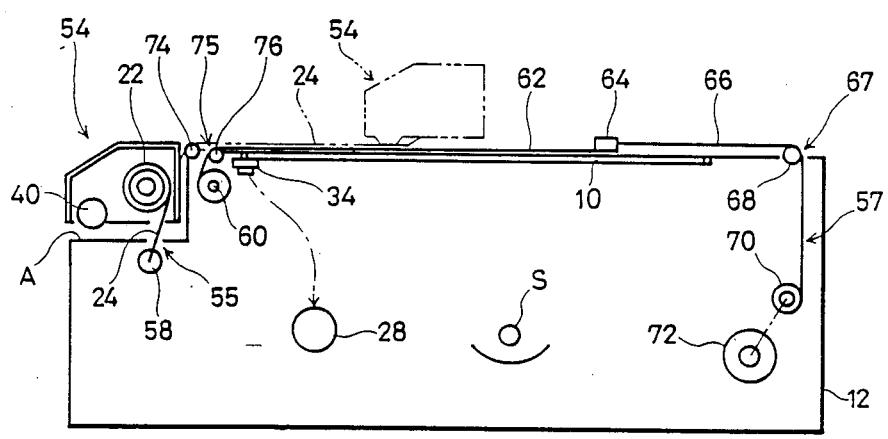
FIG. 12 is a sectional view taken along the direction VII—VII in FIG. 11.

Referring to FIGS. 11 and 12, a structure of a vacuum contact printing apparatus according to another embodiment of the invention will be described. The vacuum contact printing apparatus comprises: a base frame 12 having a transparent plate 10; a sheet roller unit 54 which runs on the base frame 12 to spread an overlay sheet 24 over the transparent plate 10; a friction reducing sheet 62 provided between the overlay sheet 24 and the transparent plate 10; a friction reducing sheet roller 60 provided in the base frame 12, for winding the friction reducing sheet 62; a sheet drawing device 57 for drawing an end of the friction reducing sheet 62 to spread the sheet 62 over the transparent plate 10; evacuating means 28 for removing the air from between the overlay sheet 24 and the transparent plate 10; and a light source S provided under the transparent plate 10.

The sheet roller unit 54 includes: a sheet roller 22 supported rotatably at both ends of its axis by a pair of side plates 42; and a pressing roller 40 which moves while pressing the overlay sheet 24. The unit 54 waits on a standby table A provided normally in the base fame 12.

A sheet fixation slit 55 into which the overlay sheet 24 is inserted is formed in the standby table A of the base frame 12. A fixing member 58 for fixing an end of the overlay sheet 24 is provided under the slit 55. A roller 74 for smoothly moving the overlay sheet 24 is provided at an edge of the upper surface of the base frame 12 on the side of the standby table A.

A slit 75 for fixing the friction reducing sheet is formed between the roller 74 and the transparent plate 10, and a roller 76 is provided at an edge of the slit 75 on the side of the transparent plate 10. The friction reducing sheet 62 is normally wound on the friction reducing sheet roller 60 and a free end thereof is drawn to the transparent plate through the slit 75.

The sheet drawing device 57 includes: a holding member 64 for holding an end of the friction reducing sheet 62 on the side of the transparent plate 10; two wires 66 each having one end fixed to the holding member 64; a wire winding roller 70 provided under the base frame 12 for winding the two wires 66; and a wire winding motor 72 for rotating the wire winding roller 70 to wind the wires 66. Two openings 67 through which the one end of each of the wires 66 is coupled to the roller 70 are formed on the upper surface of the base frame 12, near the side opposite to the standby table A. A pulley 68 is provided at an edge of each opening 67 on the side of the transparent plate 10, so as to smoothly move the corresponding wire 66.

Among the components shown in FIGS. 11 and 12, those identical to the components shown in FIGS. 3 to 6 are given the identical reference characters and the identical names. The functions and operations of those components are the same as the corresponding components in the first embodiment. Therefore, the detailed description thereof is not repeated. In FIGS. 11 and 12, the register pins and the pin bar are not shown for convenience of explanation.

Since the operation of the sheet roller unit 54 as well as the associated movement of the overlay sheet 24 is evident for those skilled in the art from the description of the first embodiment, the description thereof is not repeated. A characteristic feature of this second embodiment resides in a mechanism for spreading the friction reducing sheet 62 over the transparent plate 10.

Referring to FIGS. 11 and 12, the friction reducing sheet 62 is spread over the transparent plate 10 before the sheet roller unit 54 is spread over the transparent plate 10. The friction reducing sheet 62 is wound in advance on the roller 60. The holding member 64 is located near the slit 75 on the base frame 12. The wires 66 are unwound from the roller 70. Only the two wires 66 exist on both side ends of the transparent plate 10. The operator places an original film and a photosensitive material (both not shown) on the open transparent plate 10.

When the operator presses a start button not shown, the motor 72 starts. The roller 70 is driven and winds the wires 66. By the winding of the wires 66, the holding member 64 moves on the transparent plate toward the pulleys 68. As a result, the friction reducing sheet 62 is unwound from the roller 60 and spread over the transparent plate 10. Further, the overlay sheet 24 is spread thereon by the sheet roller unit 54.

The removal of the air by the evacuating means 28 and the exposure by the light source S are carried out in the entirely same manner as in the first embodiment and therefore the description thereof is not repeated. After the exposure, the evacuating means 28 cancels the vacuum contact. The unit 54 is moved toward the standby table A by a drive unit not shown. Since the sheet roller 22 is activated by the coil spring 82 to rotate in the direction of winding of the overlay sheet 24, the sheet roller 22 winds the overlay sheet 24 simultaneously with the movement of the unit 54.

At the same time, the motor 72 rotates in the reverse direction. The roller 70 also rotates in the reverse direction to unwind the wires 66. The roller 60 is activated to rotate in the direction of winding of the friction reducing sheet 62. The sheet 62 on the transparent plate 10 is wound by the roller 60 and the surface of the transparent plate 10 becomes open.

Also in the vacuum contact printing apparatus of the second embodiment, the friction reducing sheet 62 is interposed between the overlay sheet 24 and the photosensitive material 16. If the stress applied to the lower surface of the overlay sheet 24 is changed by the unwinding of the sheet 24 to bring the lower surface into a normal state, the lower surface of the overlay sheet 24 only slides smoothly on the friction reducing sheet 62. Thus, no friction is applied to the photosensitive material 16 as a result of the unwinding of the overlay sheet 24. The exposure in the contact state can be carried out with high precision.

It should be noted in the vacuum contact printing apparatus described above in detail that the size of the overlay sheet 24 is selected sufficiently larger than the sizes of the friction reducing sheets 36 and 62, and that the sizes of the friction reducing sheets 36 and 62 are selected so as not to obstruct the removal of the air through the evacuating groove 26. In consequence, vacuum contact can be set with high reliability.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A vacuum contact printing apparatus for optically printing an image of an original film on a photosensitive material in intimate contact with said original film, comprising:

original supporting means having a first surface, for supporting said original film and said photosensitive material in intimate contact on said first surface;

original holding means in the form of a flexible sheet, for covering said first surface and holding said original film and photosensitive material placed on said first surface between said original holding means and said first surface;

first winding means on which said original holding means is normally wound in a manner including distortion, and from which said original holding means is unwound to hold said original film and said photosensitive material;

friction reducing means provided between said first surface and said original holding means covering said first surface, for reducing frictional force between said original holding means and said original film and photosensitive material in intimate contact;

a light source for supplying light for exposure to said original film from a side opposite to said photosensitive material; and evacuating means for removing air from between said original holding means and said first surface.

2. A vacuum contact printing apparatus in accordance with claim 1, wherein:

said friction reducing means includes a friction reducing sheet having a surface friction coefficient smaller than the friction coefficient of said original holding means.

3. A vacuum contact printing apparatus in accordance with claim 2, further comprising:

second winding means on which said friction reducing sheet is normally wound and from which said friction reducing sheet is unwound when said original holding means is unwound from said first winding means.

4. A vacuum contact printing apparatus in accordance with claim 3, wherein:

said original supporting means includes a transparent plate in the form of a flat plate having said first surface and a second surface opposite thereto, and said apparatus further comprises a base frame for supporting said original supporting means.

5. A vacuum contact printing apparatus in accordance with claim 4, further comprising:

first fixing means for fixing a first end of said friction reducing sheet to said base frame, wherein said second winding means is coupled to a second end of said friction reducing sheet, opposite to said fixed first end of said first fixing means.

6. A vacuum contact printing apparatus in accordance with claim 5, further comprising:

second fixing means for fixing a first end of said original holding means to said base frame, wherein said first winding means is coupled to second end of said original holding means, opposite to said fixed first end of said second fixing means.

7. A vacuum contact printing apparatus in accordance with claim 6, wherein:

said base frame has an opening for evacuation, said opening being disposed around said original supporting means and being formed in a portion of the base frame that is covered with said original holding means; and said evacuating means includes a vacuum pump communicating with said opening.

8. A vacuum contact printing apparatus in accordance with claim 7, wherein:

said evacuating means further includes pressing evacuating means which moves according to a movement of said first winding means in the same direction as that of the movement of said first winding means while pressing said unwound original holding means, thereby removing air from between said first surface and said original holding means.

9. A vacuum contact printing apparatus in accordance with claim 4, wherein:

said second winding means includes a winding roller supported rotatably around its axis at both ends thereof by said base frame, a coupling end of said friction reducing sheet being coupled thereto to enable said friction reducing sheet to be wound onto said winding roller.

10. A vacuum contact printing apparatus in accordance with claim 9, wherein:

said winding roller is enabled to normally rotate in a direction of winding of said friction reducing sheet.

11. A vacuum contact printing apparatus in accordance with claim 10, further comprising:

unwinding means connected to an unwinding end of said coupled friction reducing sheet opposite to said end coupled to said second winding roller, for unwinding said friction reducing sheet from said second winding roller by drawing said sheet.

12. A vacuum contact printing apparatus in accordance with claim 11, wherein:
said unwinding means includes
a wire connected to the unwinding end of said friction reducing sheet, and
third winding means for winding said wire.

13. A vacuum contact printing apparatus in accordance with claim 8, wherein:
the surface of said friction reducing sheet in contact with said first surface has a rugged form in section.

14. A method employing a vacuum contact printing apparatus including transparent original supporting means having a first surface, original holding means covering said first surface of said original supporting means, first winding means on which said original holding means is normally wound, and which moves while rotating around its axis on said original supporting means to spread said original holding means over said original supporting means, friction reducing means for reducing frictional force between said spread original holding means and and an original film and a photosensitive material placed on said original supporting means, a light source for supplying light to said original supporting means from a side opposite to said original supporting means, and evacuating means for removing the air between said original holding means and said original supporting means, comprising the steps of:
placing an original film on said original supporting means;
placing a photosensitive material on said original film;
covering said placed original film and photosensitive material with said friction reducing means;
moving said first winding means on said friction reducing means by rotating said first winding means, thereby spreading said original holding means to cause said original holding means to cover said first surface;
removing air from between said original supporting means and said original holding means by said evacuating means; and
supplying light from said light source to optically print an image of said original film on said photosensitive material.

15. A vacuum contact printing method in accordance with claim 14, wherein said vacuum contact printing apparatus further includes pressing evacuating means which moves on said spread original holding means while pressing said original holding means according to the movement of said second winding means, and wherein:
said vacuum contact print method further comprises a step of removing air from between said original holding means and said original supporting means by pressing said spread original holding means by said pressing evacuating means.

16. A vacuum contact printing method in accordance with claim 14, wherein:
said step of covering said original film and photosensitive material with said friction reducing means is carried out prior to the step of covering said first surface with said original holding means.

17. A vacuum contact printing method in accordance with claim 14, wherein:
said step of covering said original film and photosensitive material with said friction reducing means is carried out simultaneously with the step of covering said first surface with said original holding means.

* * * * *

UNITED STATES PATENT AND TRADEMARK OFFICE
CERTIFICATE OF CORRECTION

PATENT NO.   :   4,982,229

DATED        :   January 1, 1991

INVENTOR(S)  :   Tatsuhiko INADA et al.

It is certified that error appears in the above-identified patent and that said Letters Patent is hereby corrected as shown below:

On the title page: Item (75) should read:

[75]   Inventors:   [Tatsuihiko] Tatsuhiko Inada

Signed and Sealed this

Twentieth Day of April, 1993

*Attest:*

MICHAEL K. KIRK

*Attesting Officer*   Acting Commissioner of Patents and Trademarks